(12) United States Patent
Andrews et al.

(10) Patent No.: US 6,921,614 B2
(45) Date of Patent: Jul. 26, 2005

(54) HIGH RESOLUTION LASERABLE ASSEMBLAGES FOR LASER-INDUCED THERMAL IMAGE TRANSFER

(75) Inventors: Gerald Donald Andrews, Hockessin, DE (US); Graciela Beatriz Blanchet-Fincher, Greenville, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/475,191

(22) PCT Filed: May 10, 2002

(86) PCT No.: PCT/US02/14606
§ 371 (c)(1),
(2), (4) Date: Oct. 16, 2003

(87) PCT Pub. No.: WO02/092352
PCT Pub. Date: Nov. 21, 2002

(65) Prior Publication Data
US 2004/0126677 A1 Jul. 1, 2004

Related U.S. Application Data

(60) Provisional application No. 60/290,296, filed on May 11, 2001.

(51) Int. Cl.[7] .................. G03F 7/34; G03F 7/039; G03F 7/11
(52) U.S. Cl. ............ 430/18; 430/200; 430/271.1; 430/275.1; 430/964
(58) Field of Search ............ 430/18, 200, 271.1, 430/275.1, 964, 271.5

(56) References Cited

U.S. PATENT DOCUMENTS

| 4,643,917 A |  | 2/1987 | Koshizuka et al. |
|---|---|---|---|
| 4,942,141 A |  | 7/1990 | DeBoer et al. |
| 4,948,776 A |  | 8/1990 | Evans et al. |
| 5,019,549 A |  | 5/1991 | Kellogg et al. |
| 5,156,938 A |  | 10/1992 | Foley et al. |
| 5,171,650 A |  | 12/1992 | Ellis et al. |
| 5,260,139 A | * | 11/1993 | Shiraishi et al. |
| 5,312,692 A | * | 5/1994 | Shiraishi |
| 5,395,729 A | * | 3/1995 | Reardon et al. |
| 5,512,931 A | * | 4/1996 | Nakajima et al. |
| 5,521,035 A | * | 5/1996 | Wolk et al. |
| 5,523,192 A |  | 6/1996 | Blanchet-Fincher |
| 5,563,019 A |  | 10/1996 | Blanchet-Fincher |
| 5,759,738 A | * | 6/1998 | Tsuno et al. |
| 5,766,819 A | * | 6/1998 | Blanchet-Fincher |
| 5,939,207 A | * | 8/1999 | Fensore et al. |
| 6,020,416 A | * | 2/2000 | Mazur et al. |
| 6,051,318 A | * | 4/2000 | Kwon |
| 6,096,472 A | * | 8/2000 | Niemeyer |
| 6,143,451 A |  | 11/2000 | Blanchet-Fincher |
| 6,228,543 B1 | * | 5/2001 | Mizuno et al. |

FOREIGN PATENT DOCUMENTS

GB 2 083 726 4/1982

* cited by examiner

Primary Examiner—Richard L. Schilling

(57) ABSTRACT

This invention relates to laserable assemblages for use in laser-induced thermal transfer imaging which result in improvements in resolution and toughness in the transferred image when two binders differing in glass transition temperature are incorporated into the transfer layer.

15 Claims, 8 Drawing Sheets

HIGH RESOLUTION LASERABLE ASSEMBLAGES FOR LASER-INDUCED THERMAL IMAGE TRANSFER

This application claims the benefit of Provisional application Ser. No. 60/290,296, filed May 11, 2001.

FIELD OF THE INVENTION

This invention relates to improved laserable assemblages for use in laser-induced thermal transfer imaging. In particular, it relates to improvements in resolution and toughness in the transferred image when two binders differing in glass transition temperature are incorporated into the transfer layer. The invention is of particular utility in the formation of color filters in high resolution liquid crystal displays.

BACKGROUND OF THE INVENTION

Liquid crystal display (LCD) devices have become increasingly important in displays which require very low consumption of electrical power or where the environment dictates a lightweight, planar, flat surface; For example, LCDs are used in display devices such as wristwatches, pocket and personal computers, and aircraft cockpit displays. When there is a need to incorporate a color display capability into such display devices, a component called a color filter is used. For the device to have color capability, each pixel is aligned with a color area, typically red, green, or blue, of a color filter array. Depending upon the image to be displayed, one or more of the pixel electrodes is energized during display operation to allow full light, no light, or partial light to be transmitted through the color filter area associated with that pixel. The image perceived by a user is a blend of colors formed by the transmission of light through adjacent color filter areas.

A major contributor to the cost of color LCDs is the color filter. Four color filter manufacturing methods are known in the art, viz., dye gelatin, pigmented photoresist, electrodeposition and printing. The pigmented photoresist method offers the best trade-off of degradation resistance, optical properties, and flexibility along with high resolution, and is generally preferred. While conventional photolithographic materials and methods may be employed in the photoresist method, it suffers from the high cost and inconvenience associated with numerous process steps, some involving wet chemistry.

Laser-induced thermal transfer processes are well-known in applications such as color proofing and lithography and have been described in, for example, Baldock, U.K. Patent 2,083,726; DeBoer, U.S. Pat. No. 4,942,141; Kellogg, U.S. Pat. No. 5,019,549; Evans, U.S. Pat. No. 4,948,776; Foley et al., U.S. Pat. No. 5,156,938; Ellis et al., U.S. Pat. No. 5,171,650; and Koshizuka et al., U.S. Pat. No. 4,643,917.

As is known in the art, laser-induced processes use a laserable assemblage comprising (a) a donor element containing the material to be transferred in contact with (b) a receiver element. The laserable assemblage is exposed to a laser, usually a pulsed infrared laser, resulting in transfer of material from the donor element to the receiver element. To form an image, exposure takes place over a small region of the laserable assemblage at any one time, so that transfer of material from the donor element to the receiver element can be built up one pixel at a time. Computer control of the laser produces transfer with high resolution and at high speed. The laserable assemblage, upon imagewise exposure to a laser as described supra, is henceforth termed an imaged laserable assemblage.

For the preparation of images for proofing applications and in photomask fabrication, the imageable component comprises a colorant. For the preparation of lithographic printing plates, the imageable component comprises an olephilic material which will receive and transfer ink in printing.

Laser-induced processes are fast and result in transfer of material with high resolution. However, in many cases, the resulting transferred material does not have the required durability. In dye sublimation processes, light-fastness is frequently lacking. In ablative and melt transfer processes, poor adhesion and/or durability can be a problem. In U.S. Pat. No. 5,563,019 and U.S. Pat. No. 5,523,192, improved multilayer laserable assemblages and associated processes are disclosed that do afford improved adhesion and/or durability of the transferred images. In U.S. Pat. No. 6,051,318 an improved donor film for use in the production of color filters is disclosed. U.S. Pat. No. 6,143,451 discloses a laser-induced thermal image transfer imaging process characterized by the use of an ejection layer which affords advantages in the final imaged product.

As is known in the art, the transfer layer in a laserable assemblage always contains some sort of binder, generally a polymeric binder. The binder serves to hold together the colorant and any adjuvants thereto before, during and after the image transfer process is effected, forming a single cohesive, homogeneous mass. It is found that the physical properties of the binder have significant effect on the properties of the transferred image. In particular, it has been found in the practice of the art that binders characterized by glass transition temperatures near or below room temperature provide good toughness and durability with superior adhesive properties, but often at the expense of resolution. On the other hand, binders characterized by glass transition temperatures well above room temperature provide superior resolution but at the expense of toughness, durability, and adhesion. Practical application of laser-induced thermal image transfer to high resolution applications such as color filter formation requires toughness and adhesion sufficient to permit survival of the transferred image during the remainder of the manufacturing process. The resolution requirements for the color filter application are extremely demanding, and little trade-off can be made while preserving utility in the application.

Aqueous blends of colloidally dispersed polymers for use in making organic coatings which are hard and ductile at ambient temperature and which remain stiff and elastic at elevated temperature are disclosed in Mazur et al, U.S. Pat. No. 6,020,416. The surprising combination of properties is attributed to the use of high molecular weight polymers differing in glass transition temperature.

SUMMARY OF THE INVENTION

The present invention provides for a novel donor element suitable for incorporation into a laserable assemblage, wherein the donor element comprises a substrate, a metallic or carbon, heating layer, one or more transfer layers and an optional ejection layer, said novel donor element further comprising a transfer layer deposited on said heating layer, said transfer layer comprising an imageable component and a binder composition comprising a first polymeric binder and a second polymeric binder, said first polymeric binder being characterized by a glass transition temperature at least 20 centigrade degrees higher than the glass transition temperature characteristic of said second polymeric binder. In some embodiments a donor support may also be present. In a preferred embodiment, the substrate is polymeric.

The present invention further provides for a laserable assemblage comprising:

a donor element, wherein the donor element comprises a substrate, a metallic or carbon heating layer, one or more transfer layers and an optional ejection layer, further comprising a transfer layer deposited on said heating layer, said transfer layer comprising an imageable component a binder composition comprising a first polymeric binder and a second polymeric binder, said first polymeric binder being characterized by a glass transition temperature at least 20 centigrade degrees higher than the glass transition temperature characteristic of said second polymeric binder;

and a receiver element in effective contact with the transfer layer of the donor element. In some embodiments a donor support may also be present.

Further provided in the present invention is an imaged laserable assemblage comprising an imageable component and a binder composition comprising a first polymeric binder and a second polymeric binder, said first polymeric binder being characterized by a glass transition temperature at least 20 centigrade degrees higher than the glass transition temperature characteristic of said second polymeric binder.

Also provided in the present invention is an image disposed upon a substrate, the image comprising an imageable component and a binder composition comprising a first polymeric binder and a second polymeric binder, said first polymeric binder being characterized by a glass transition temperature at least 20 centigrade degrees higher than the glass transition temperature characteristic of said second polymeric binder.

DETAILED DESCRIPTION OF THE INVENTION

Figure 1:
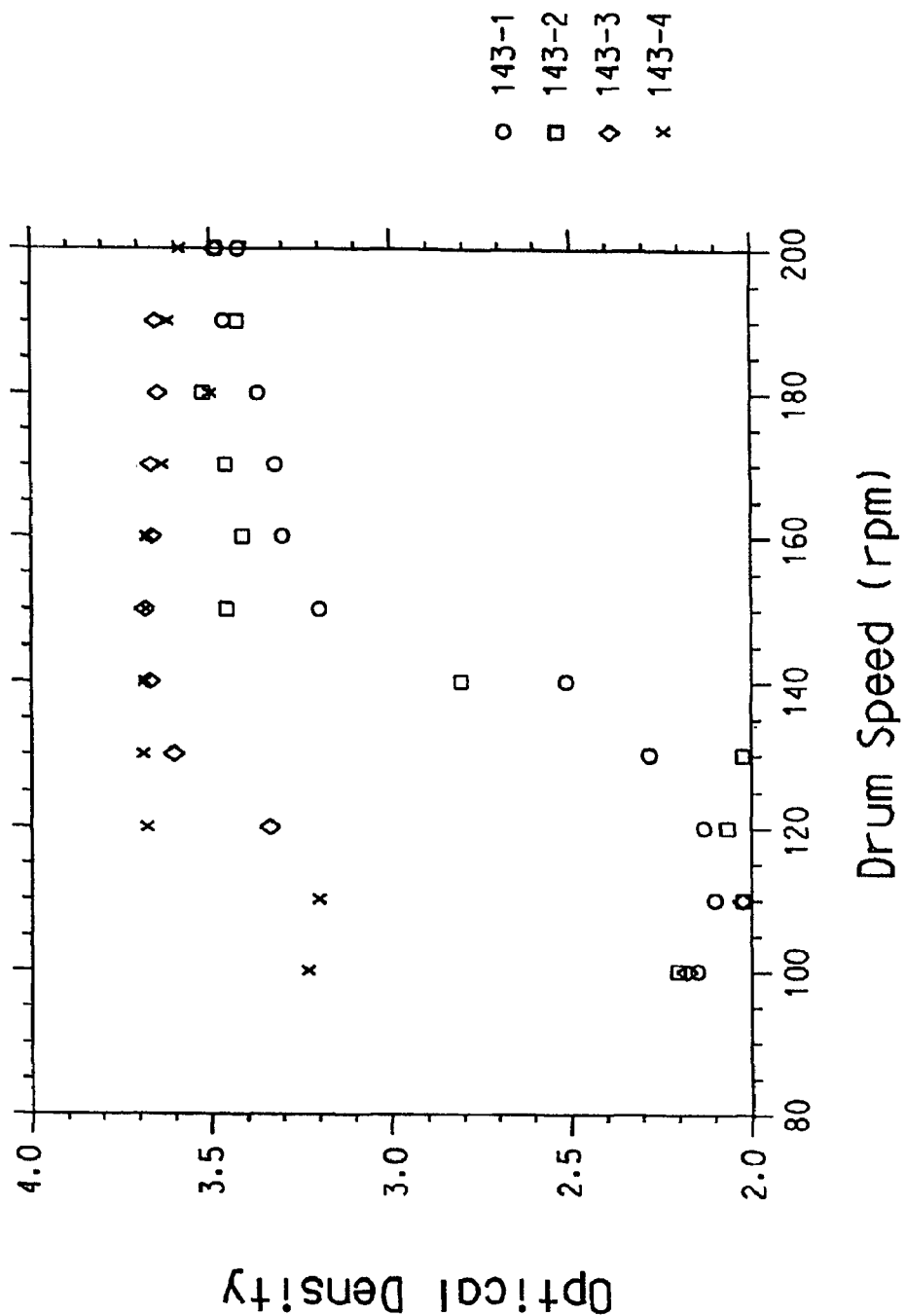
FIG. 1 is a graph showing the optical density versus drum speed of the images transferred in Examples 1–4.
Figure 2:
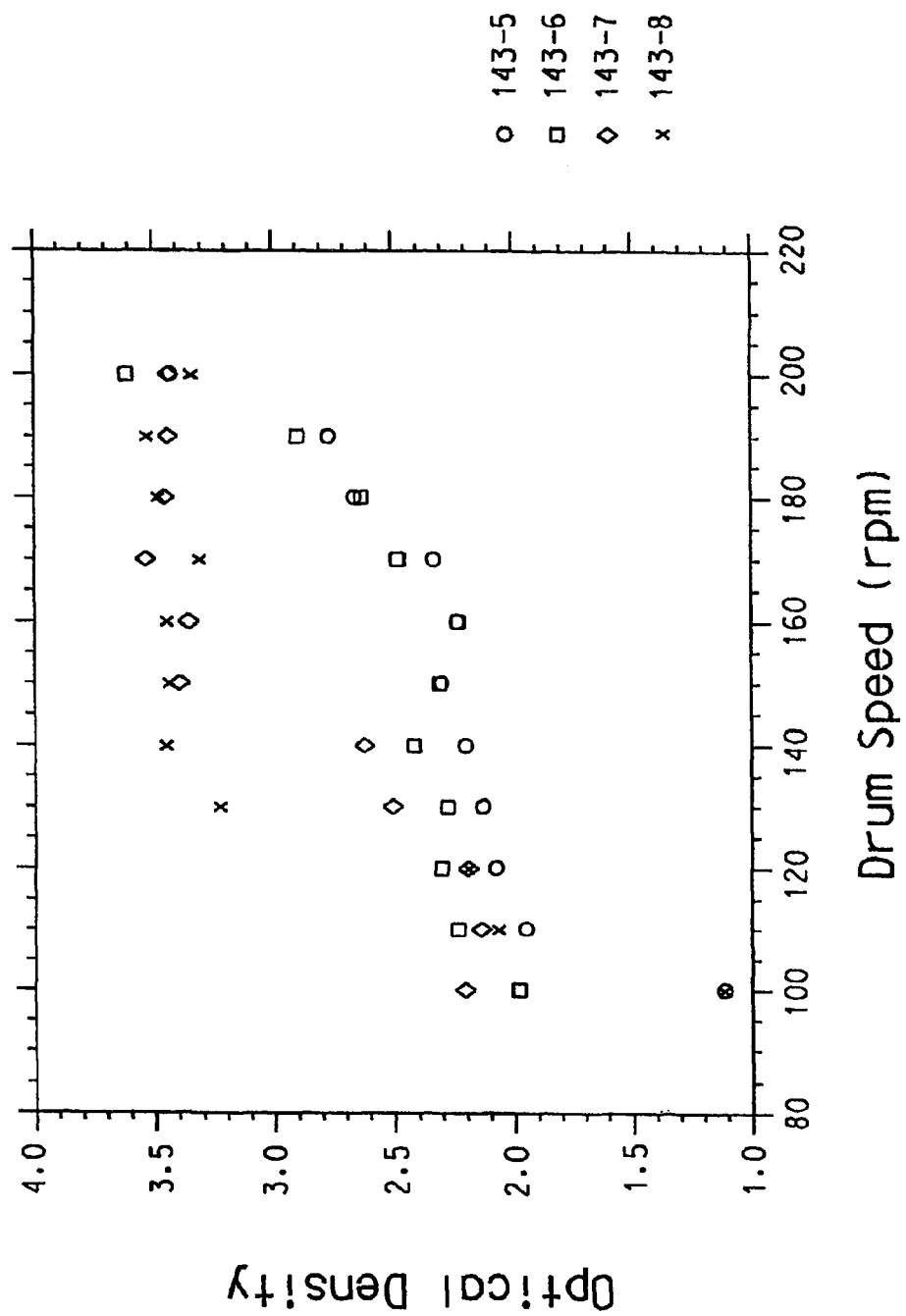
FIG. 2 is a graph showing the optical density versus drum speed of the images transferred in Examples 5–8.

The laserable assemblage of the present invention combines the benefits in toughness, durability and adhesion of a binder characterized by a relatively low glass transition temperature, and the high resolution of a binder characterized by a relatively high glass transition temperature by combining two or more polymeric binders at least one pair of which said binders differ in glass transition temperatures by at least 20 centigrade degrees.

According to the present invention a laserable assemblage is formed according to means known in the art. Suitable uses for laser thermal image transfer processes employing laserable assemblages include any application in which solid material is to be applied to a receptor in a pattern. The laserable assemblage of the present invention is suitable for use in any such application where laserable assemblages are useful. Preferred uses include color proofing, the formation of color filter arrays, photomasks, and photolithography. Other uses include but are not limited to imagewise deposition of magnetic materials, fluorescent materials, and electrically conducting materials on suitable receivers.

In a particularly preferred embodiment, the laserable assemblage of the present invention comprises crosslinkable binders which are particularly well-suited for use in the formation of color filter elements for use in liquid crystal display (LCD) devices.

The formation of laserable assemblages, the components employed for the formation thereof, and the methods of their use are well-known in the art, and are described in considerable detail therein. In U.S. Pat. No. 5,563,019, incorporated herein, by reference in its entirety, and U.S. Pat. No. 5,523,192, incorporated herein by reference in its entirety, are described improved multilayer laserable assemblages and associated processes. In U.S. Pat. No. 6,051,318, incorporated herein by reference in its entirety, an improved donor film for use in the production of color filters is disclosed. U.S. Pat. No. 6,143,451, incorporated herein by reference in its entirety, discloses a laser-induced thermal image transfer imaging process characterized by the use of an ejection layer which affords advantages in the final imaged product The laserable assemblage of the invention comprises (a) a donor element that contains the imageable,component and two or more polymeric binders at least one pair of which said binders differ in glass transition temperature by at least 20 centigrade degrees, and (b) a receiver element in effective contact with said donor element. In use, the laserable assemblage is imagewise exposed to a laser, usually a pulsed infrared laser, resulting in transfer of material imagewise, commonly one pixel at a time, from the donor element to the receiver element.

Upon exposure and imagewise transfer of material, the resulting laserable assemblage is termed an imaged laserable assemblage which comprises both the receiver element with the transferred image and the donor element with the non-imaged areas still on it. Preferably, the imaged laserable assemblage is separated into the imaged donor element and the imaged receiver element. To use a photographic analogy, after imaging the receiver element bears the positive image and the donor element bears the negative image. Either the imaged donor element and/or the imaged receiver element can represent imaged products in accordance with this invention. The imaged products of the invention comprise an imageable component and two or more binders at least one pair of which said binders differ in glass transition temperatures by at least 20 centigrade degrees.

Donor Element

Figure 3A:
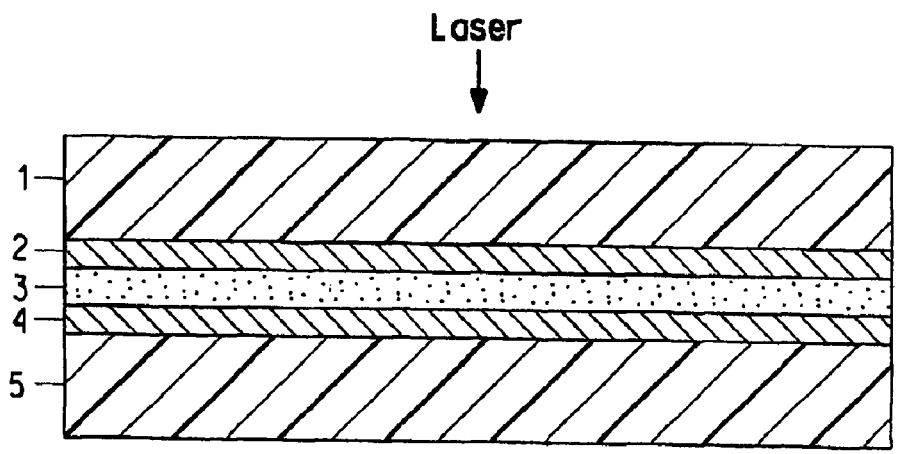
FIGS. 3A–G illustrate all the steps in the thermal imaging process.
Figure 3B:
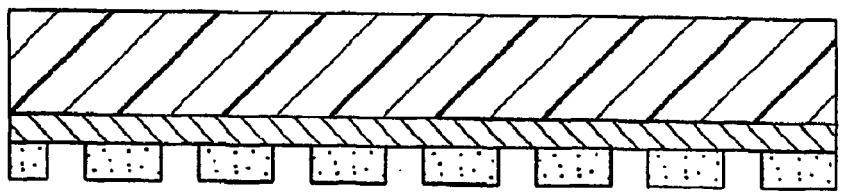
Figure 3C:
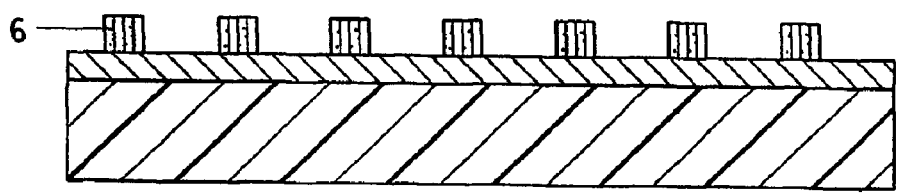
Figure 3D:
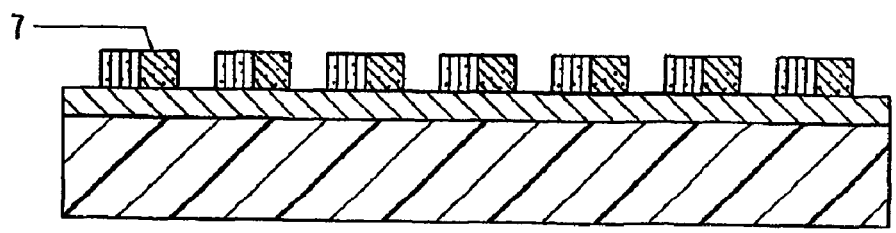
Figure 3E:
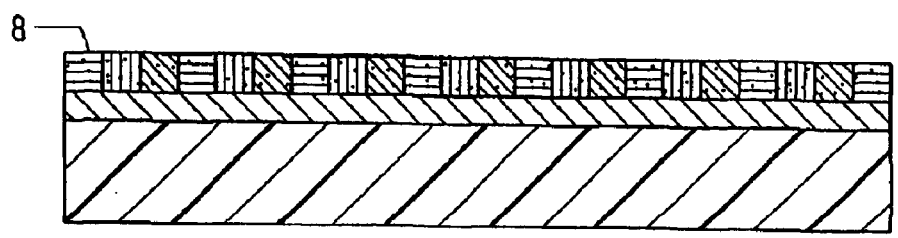
Figure 3F:
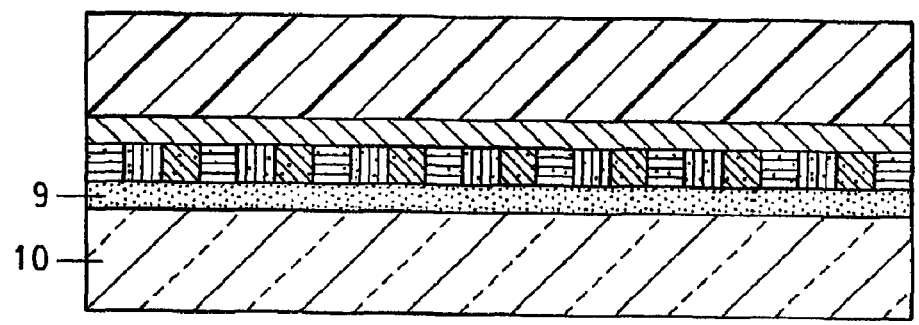
Figure 3G:
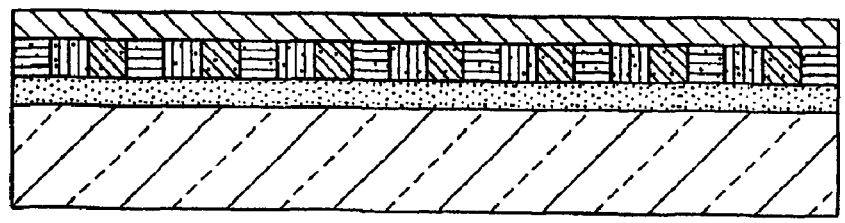

As is well-known in the art and in accordance with the present invention, the donor element shown in FIG. 3A comprises a polymeric substrate (1), a heating layer (2), a transfer layer (3) and an optional ejection layer (not shown). Each of these layers has separate and distinct functions as described, infra. In certain embodiments, a donor support can also be present. It will be understood by one of skill in the art that the specific functions of each of said layers may under various circumstances be consolidated into one or more layers in a wide variety of ways particular to the particular embodiment of the invention. However, preferably, and in the general case, a discrete layer embodies each function to be performed. It is that preferred embodiment which is described hereinbelow.

Substrate

Materials suitable for use as the donor substrate (1) include but are not limited to poly(ethylene terephthalate) (PET), polypropylene, polyethylene, polyvinyl chloride, and flexible glass. Preferred polymers for the substrate are polyvinyl chloride and PET. Most preferred is PET.

If the laserable assemblage is to be imaged through the donor substrate, the substrate should be capable of transmitting most of the laser radiation with minimal deleterious effect on the substrate.

Numerous additives, such as are known in the art, may be present in the substrate as long as they do not interfere with the essential function of the substrate. Examples of such additives include but are not limited to coating aids, flow additives, slip agents, antihalation agents, antistatic agents, and surfactants.

In the preferred embodiment, one or more plasticizers such as are described in the art, is incorporated into the polymeric substrate by ordinary means to achieve the desired flexibility.

The polymeric substrate typically has a thickness of about 25 micrometers to about 250 micrometers, preferably about 50 micrometers to about 150 micrometers. The most preferred thickness is about 75 micrometers to about 100 micrometers.

Heating Layer

The heating layer (2) is deposited on the polymeric substrate by any suitable method known in the art including sputtering, vacuum deposition, chemical vapor deposition, and electron beam deposition. The heating layer may consist essentially of a metal or carbon. The function of the heating layer is to absorb the laser radiation and convert the radiation into heat.

Suitable metals include transition metals and metallic elements of Groups IIIa, IVa, Va, VIa, VIII, IIIb, and Vb, their alloys with each other, and their alloys with the elements of Groups Ia and IIa. Preferred metals include Al, Cr, Sb, Ti, Bi, Zr, TiO2, Ni, In, Zn, and their alloys; carbon is also preferred. More preferred are Al, Ni, Cr, Zr and C. Most preferred are Al, Ni, Cr, and Zr.

The heating layer preferably consists essentially of one material applied in a single layer. However, it is acceptable in the practice of the present invention to make up the heating layer by successive deposition of more than one suitable material to form a multi-layer structure. The thickness of the heating layer is generally about 2 nanometers to 100 nanometers, preferably about 5 to 10 nanometers.

Transfer Layer

The transfer layer (3) lies at the heart of the present invention. The transfer layer of the present invention comprises (a) two or more polymeric binders at least one pair of which said binders differ in glass transition temperature ($T_g$) by at least 20 centigrade degrees, and (b) an imageable component. Preferably the binders differ in $T_g$ by at least 40 centigrade degrees. Most preferably the binders differ in $T_g$ by at least 80 centigrade degrees.

The higher $T_g$ binder of the pair exhibits a $T_g$ of between 20 and 140 centigrade degrees higher than the $T_g$ of the lower $T_g$ binder in the pair. The $T_g$ of the higher $T_g$ binder in the pair ranges from 70° C. to 140° C. The $T_g$ of the lower $T_g$ binder of the pair ranges from −40° C. to 60° C. Preferably the $T_g$ of the higher $T_g$ binder of the pair ranges from 100° C. to 140° C. Preferably the $T_g$ of the lower $T_g$ binder of the pair ranges from −40° C. to 0° C.

The polymeric binder suitable for use in the present invention preferably does not self-oxidize, decompose or degrade at the temperatures to which it exposed during the laser exposure so that the imageable component and binder are transferred with little or no degradation. Binder polymers suitable for use as the high $T_g$ component of the pair include, but are not limited to, polystyrene and copolymers thereof, acrylates, methacrylates and co-polymers thereof. Binder polymers suitable for use as the low $T_g$ component of the pair include but are not limited to butyl acrylates and co-polymers thereof. The monomer units present in the polymeric binders suitable for use in the present invention may be substituted or unsubstituted. Mixtures of polymers can also be used.

In a preferred embodiment, 1–5 mol-% of a crosslinkable monomer is incorporated into the polymeric binders of the instant invention. After cross-linking, the binders exhibit resistance to the temperatures and solvents employed in the formation of color filter arrays in liquid crystal display devices, making this embodiment highly preferred in that application. Suitable crosslinkable comonomers include but are not limited to hydroxy ethyl methacrylate and glycidyl methacrylate.

The polymeric binders suitable for use in the present invention are present at a concentration of about 15–50% by weight, preferably 30–40% by weight, based on the total weight of the transfer layer. The weight ratio of higher $T_g$ binder to lower $T_g$ binder should be in the range of 60:40 to 95:5, preferably in the range of 75:25 to 92:8.

The binders suitable for use in the present invention are synthesized preferably in the form of latex dispersions, as described in Mazur et al, U.S. Pat. No. 6,020,416, incorporated herein by reference to the entirety, and as hereinbelow exemplified. The synthesis of polymer latexes is a very well-known art in widespread commercial use.

In a preferred embodiment, one or more of the polymeric binders comprise monomer units having pendant groups which are capable of undergoing free-radical induced or cationic crosslinking reactions. Pendant groups which are capable of undergoing free-radical induced crosslinking reactions are generally those which contain sites of ethylenic unsaturation, such as mono- and polyunsaturated alkyl groups; acrylic and methacrylic acids and esters. In some cases, the pendant crosslinking group can be photosensitive, as is the case with pendant cinnamoyl or N-alkyl stilbazolium groups. Pendant groups which are capable of undergoing cationic crosslinking reactions include substituted and unsubstituted epoxide and aziridine groups.

Crosslinkable binders suitable for the practice of the invention can be formed by direct copolymerization of one or more ethylenically unsaturated dicarboxylic acid anhydrides, or the corresponding alkyl diesters, with one or more of the above comonomers. Suitable ethylenically unsaturated dicarboxylic acid anhydrides are, for example, maleic anhydride, itaconic acid anhydride and citraconic acid anhydride and alkyl diesters such as the diisobutyl ester of maleic anhydride. The copolymer binder containing acid anhydride functionality can be reacted with primary aliphatic or aromatic amines.

For color imaging applications, such as color proofing or color filter array formation, the imageable component will comprise a colorant. The colorant can be a pigment or a non-sublimable dye. It is preferred to use a pigment as the colorant for stability and for color density, and also for the high decomposition temperature. Examples of suitable inorganic pigments include carbon black and graphite. Examples of suitable organic pigments include Rubine F6B (C.I. No. Pigment 184); Cromophthal® Yellow 3G (C.I. No. Pigment Yellow 93); Hostaperm® Yellow 3G (C.I. No. Pigment Yellow 154); Monastral® Violet R (C.I. No. Pigment Violet 19); 2,9-dimethylquinacridone (C.I. No. Pigment Red 122); Indofast® Brilliant Scarlet R6300 (C.I. No. Pigment Red 123); Quindo Magenta RV 6803; Monastral® Blue G (C.I. No. Pigment Blue 15); Monastral® Blue BT 383D (C.I. No. Pigment Blue 15); Monastral® Blue G BT 284D (C.I. No. Pigment Blue 15); and Monastral® Green GT 751D (C.I. No. Pigment Green 7). Combinations of pigments and/or dyes can also be used.

For color filter array applications, the imageable component is preferably a high transparency pigment through which ca. 80% of incident light energy passes through unabsorbed, and having a latex particle size of ca. 100 nanometers.

In accordance with principles well known to those skilled in the art, the concentration of colorant will be chosen to achieve the optical density desired in the final image. The amount of colorant will depend on the thickness of the active coating and the absorption of the colorant. Optical densities greater than 1.3 are typically required. Even higher densities are preferred. Optical densities in the 2–3 range or higher are achievable with application of this invention.

A dispersant is usually present when a pigment is to be transferred, in order to achieve maximum color strength, transparency and gloss. The dispersant is generally an organic polymeric compound and is used to separate the fine pigment particles and avoid flocculation and agglomeration. A wide range of dispersants is commercially available. A dispersant will be selected according to the characteristics of the pigment surface and other components in the composition as practiced by those skilled in the art. One suitable type of dispersant is described in "Use of AB Block Polymers as Dispersants for Non-aqueous Coating Systems", by H. C. Jakubauskas, *Journal of Coating Technology*, Vol. 58, No. 736, pages 71–82. Suitable AB dispersants are disclosed in U.K. Patent 1,339,930 and U.S. Pat. Nos. 3,684,771; 3,788,996; 4,070,388; 4,912,019; and 4,032,698. Conventional pigment dispersing techniques, such as ball milling, sand milling, etc., can be employed. For color filter applications, the binder polymers of the transfer layer can in some cases also act as dispersants for the pigment.

For lithographic applications, the imageable component is an oleophilic, ink-receptive material. The oleophilic material is usually a film-forming polymeric material and may be the same as the binder. Examples of suitable oleophilic materials include polymers and copolymers of acrylates and methacrylates; polyolefins; polyurethanes; polyesters; polyaramids; epoxy resins; novolak resins; and combinations thereof. Preferred oleophilic materials are acrylic polymers. In lithographic applications, a colorant can also be present in the transfer layer. The colorant facilitates inspection of the plate after it is made. Any colorants suitable for use in the invention may be employed.

For photomask applications, a dye, generally a black dye and/or pigment such as carbon black or other dark material is present in the transfer layer as the imageable component. The imageable component(s) for photomask applications are chosen such that optical densities on the receiver element in areas where material has been transferred are preferably at least 2.0 and more preferably are about 3.0 or higher.

In general, for color proofing, photomask, and lithographic printing applications, the imageable component is present in an amount of from about 25 to 95% by weight, based on the total weight of the transfer coating. For color proofing applications, the amount of imageable component is preferably 35–65% by weight; for lithographic printing applications, preferably 65–85% by weight.

The color filter array to be used in fabrication of a liquid crystal display device may have to withstand exposure to solvents and heat.

For color filter applications, a dye and/or pigment is present in the transfer layer as the imageable component. The imageable component(s) for color filter applications are chosen such that optical densities on the receiver element in areas where material has been transferred are preferably between 1.0 and 2.0 for red, blue and green, and between 3.0 and 4.0 for black. In general, the imageable component is present in an amount of from about 20 to 80% by weight, preferably 30 to 50% by weight, based on the total weight of the transfer coating.

Other materials can be present as additives in the transfer layer as long as they do not interfere with the essential function of the layer. Examples of such additives include coating aids, plasticizers, flow additives, slip agents, antihalation agents, antistatic agents, surfactants, and others which are known to be used in the formulation of coatings. However, it is preferred to minimize the amount of additional materials in this layer, as they may deleteriously affect the final product after transfer. Additives may add unwanted color for color proofing applications, or they may decrease durability and print life in lithographic printing applications.

The transfer layer generally has a thickness in the range of about 0.1 to 5 micrometers, preferably in the range of about 0.1 to 1.5 micrometers. Thicknesses greater than about 5 micrometers are generally not preferred as they require excessive energy in order to be effectively transferred to the receiver.

Although it is preferred to have a single transfer layer, it is also possible to have more than one transfer layer, and the different layers can have the same or different compositions, as long as they all function as described above. The total thickness of the combined transfer layers should be in the range given above.

The transfer layer(s) can be coated onto the heating layer of the donor or on a temporary support as a dispersion in a suitable solvent, however, it is preferred to coat the layer(s) from a solution using conventional coating techniques or printing techniques, for example, gravure printing. Any suitable solvent can be used as a coating solvent, as long as it does not deleteriously affect the properties of the assemblage.

A laser-absorbing dye may be incorporated into the donor layer as a thermal amplification additive. The function of such an additive is to absorb the incident radiation and convert it into heat, leading to more efficient heating. It is preferred that the dye absorb in the infrared region. For imaging applications, it is also preferred that the dye have very low absorption in the visible region. Examples of suitable infrared absorbing dyes which can be used alone or in combination include poly(substituted) phthalocyanine compounds and metal-containing phthalocyanine compounds; cyanine dyes; squarylium dyes; chalcogenopyryioacrylidene dyes; croconium dyes; metal thiolate dyes; bis(chalcogenopyrylo) polymethine dyes; oxyindolizine dyes; bis(aminoaryl) polymethine dyes; merocyanine dyes; and quinoid dyes.

Infrared absorbing materials disclosed in U.S. Pat. Nos. 4,778,128; 4,942,141; 4,948,778; 4,950,639; 5,019,549; 4,948,776; 4,948,777 and 4,952,552 may also be employed as thermal amplification additives.

The weight percentage of the thermal amplification additive, versus, for example, the total solid weight composition of the donor layer may range from 0–20%. When present in the transfer coating, the thermal amplification weight percentage is generally at a level of 0.95–11.5%. The percentage can range up to 25% of the total weight percentage in the transfer coating. These percentages are nonlimiting and one of ordinary skill in the art can vary them depending upon the particular composition of the donor layer.

Receiver Element

The receiver element is the part of the laserable assemblage to which the imageable component and polymeric binders, that is, the transfer layer, are transferred. In most instances effective transfer requires the donor and receiver elements to be in direct physical contact throughout the imaged area.

The receiver element may consist of a single layer, or a multi-layer element. There is no particular limitation on the materials suitable for employment in the receiver except that it be capable of retaining the transferred image and that it be dimensionally stable. Suitable materials include PET, polyether sulfone, polyimide, poly(vinyl alcohol-co-acetal), polyethylene, cellulose ester, such as cellulose acetate. The materials may be in various forms including continuous polymeric films or sheets, or in the form of spun-bonded sheets such as Tyvek® spun-bonded polyolefin. The polymer so employed may contain opacifying fillers if so desired. The particular selection of receiver element materials will depend upon the exigencies of the particular application for the laserable assemblage of the invention. For example, paper-like supports are preferred for proofing applications, while poly(ethylene terephthalate) is preferred for medical hardcopy and color filter array applications. For color filter applications, the receiver element can also include receptor elements such as a flexible glass stubstrate optionally with an image-receiving layer.

In another embodiment, suitable for use in photomask applications, the receiver element comprises photosensitive materials, especially photohardenable materials, such as are well-known in the art.

As is shown in FIG. 3A, the receiver element preferably has an image-receiving layer (4) on one surface of the support layer (5). The image-receiving layer (4) can be a coating of, for example, polycarbonate; polyurethane; polyester; polyvinyl chloride; styrene/acrylonitrile copolymer; poly(caprolactone); vinylacetate copolymers with ethylene and/or vinyl chloride; (meth)acrylate homopolymers (such as butyl-methacrylate) and copolymers; and mixtures thereof. This image-receiving layer can be present in any amount effective for the intended purpose. In general, good results have been obtained at coating weights of 1 to 5 microns.

In a preferred embodiment of the present invention the laserable assemblage of the invention is employed for fabrication of color filter arrays. In this and other embodiments, laser imaging is followed by one or more transfer steps by which the image layer on the receiving element is transferred to a final support, such as a flexible glass sheet, suitable for incorporation into a liquid crystal display. In such an embodiment, it is highly preferred to include a release layer between the support layer and the image-receiving layer of the receiving element. Suitable for use as the release layer are polyamides, silicones, vinyl chloride polymers and copolymers, vinyl acetate polymers and copolymers, and plasticized polyvinyl alcohols. The release layer can have a thickness in the range of 1 to 50 microns.

In a more preferred embodiment, a deformable layer is also present in the receiving layer, generally disposed between the release layer and the receiver support. The deformable layer serves to improve the intimacy of contact between the receiver element and the donor element when assembled. Examples of suitable materials for use as the deformable layer include copolymers of styrene and olefin monomers such as styrene/ethylene/butylene/styrene, styrene/butylene/styrene block copolymers, and other elastomers useful as binders in flexographic plate applications.

In the most preferred embodiment of the present invention, the receiving element comprises at least one crosslinkable binder in the image-receiving layer.

Various types of lasers can be used to expose the laserable assemblage. The laser is preferably one emitting in the infrared, near-infrared or visible region. Particularly advantageous are diode lasers emitting in the region of 750 to 870 nm which offer a substantial advantage in terms of their small size, low cost, stability, reliability, ruggedness and ease of modulation. Diode lasers emitting in the range of 780 to 850 nm are most preferred. Laser fluence about 400 mJ/cm2, is suitable for the practice of the invention. Excessive fluence should be avoided to limit degradation of the transfer layer. Suitable lasers are available from, for example, Spectra Diode Laboratories (San Jose, Calif.).

The laserable assemblage is exposed imagewise so that material, i.e., the crosslinkable binders and the imageable component, is transferred to the receiver element in a pattern. The pattern itself can be, for example, in the form of dots or line work generated by a computer such as a digitized image taken from original artwork. The laser beam and the laserable assemblage are in constant motion with respect to each other, such that each minute area or pixel of the assemblage is individually addressed by the laser. This is generally accomplished by mounting the laserable assemblage on a rotatable drum. A flat bed recorder can also be used.

For donor elements of this invention that are used to make a photomask on a photosensitive element for subsequent use in making a relief image, the material transferred from the donor to the receiver and which becomes a mask area, or, alternatively, in other embodiments the material remaining on the donor as a mask area should be "substantially opaque to actinic radiation". The term "substantially opaque to actinic radiation" means that the amount of actinic radiation transmitted to the underlying photosensitive layer or photohardenable layer is so miniscule that no significant amount of photoinduced reaction occurs in the photosensitive or photohardenable layer. The material of the donor element may be transferred to the coversheet or the barrier layer or the photohardenable layer of the photosensitive receiver element.

After exposure, the donor and receiver elements are normally, though not necessarily, separated. Separation can be achieved using any conventional separation technique and can be manual or automatic.

While it is normally the imaged receiver element which is employed in one or another application, it is also possible for the intended product of laser imaging to be the donor element after laser exposure. For example, if the donor support is transparent, the donor element can be used as a phototool for conventional analog exposure of photosensitive materials, e.g., photoresists, photopolymer printing plates, photosensitive proofing materials, medical hard copies, and the like.

In proofing and color filter array applications, the receiver element can be an intermediate element onto which a multicolor image is built up. A donor element having a first imageable component in the transfer layer is exposed and separated as described above. The receiver element has an image formed with the first imageable component. Thereafter, a second donor element having an imageable component in the transfer layer different from that of the first donor element forms a laserable assemblage with the receiver element having the image of the first imageable component and is imagewise exposed and separated as described above. The color image on the receiver element can then be transferred for example by lamination to a permanent substrate, such as paper for proofing applications, or to a flexible glass substrate or polarizing filter element of an LCD device for color filter array applications. After laminating the receiver element intermediate to the permanent substrate and removing the receiver element substrate, the image-receiving layer may remain with the transfer layer thus laminated. The image-receiving layer can then act as a planarizing layer to provide a substantially planar layer on the outer surface of the LCD device and thereby obscure any nonuniformities in the thickness of the color filter layer.

For the embodiments of this invention that involve fabrication of a photomask on a photosensitive element and subsequent use of the photomask to create a relief image such additional processing steps as are known in the art will be required, including imagewise exposure of the photosensitive followed by development according to the methods of the art thus creating a relief image.

In those embodiments of the invention in which the polymeric binders comprise crosslinkable elements, particularly in the most preferred embodiment wherein the imaged laserable assemblage will be employed in the fabrication of color filter arrays, it is preferred to follow the image transfer by laser irradiation by a cross-linking step. When the receiver element of the laserable assemblage of the invention is employed as an intermediate element which is laminated to a permanent substrate such as a flexible glass substrate, it is found convenient in the practice of the invention to effect the cross-linking by heating the receiver element to a temperature at which the free-radical initiator is activated while simultaneously effecting the lamination. Temperatures of 100–140° C. are typical.

EXAMPLES

Synthesis of Binder Polymers $T_g$ (Glass transition temperature) values reported are mid-point temperatures in degrees Centigrade from DSC scans recorded according to ASTM D3418–82.

Molecular weights were measured by gel permeation chromatography (GPC). The equipment used consisted of the following: Columns, 2–5 $\mu$m×300 mm×7.5 mm (Poly Lab part # 1110,6500); Detector, Waters (Waters, Inc., Milford, Mass.) 410 Refractive Index detector; Pump, Waters 590; and Waters column heater. Conditions used were: Refractive Index detector internal temperature, 30° C.; Column heater temperature, 30° C.; THF solvent, 0.025% BHT inhibited (from Omnisolv, part # TX0282,1 distilled LC grade); Flow rate, 1 ml/min; Concentration, 0.1% (10 mg/10 ml). Samples were prepared by dissolving parts of the samples used for solids determination overnight with gentle shaking, and then filtering through 0.5 $\mu$m filter (Millipore, Bedford, Mass., part # SLSR025NB).

Dynamic light scattering was performed using Brookhaven Instrument BI-9000AT digital correlator (Brookhaven Instruments, Brookhaven, N.Y.). An argon-ion laser with wavelength 488 nm and power 200 mW was used. Measurements were made at room temperature with scattering angle 60°. The samples were diluted 200 uL into 20 mL water then again 100 uL into 20 mL water, then filtered with 0.45 micron filter. The results are reported as diameter (particle size) in nm units. For general discussions of the determination of particle sizes by quasielastic light scattering, see *Paint and Surface Coatings: Theory and Practice*, ed. By R. Lombourne, Ellis Horwood Ltd., West Sussex, England, 1987, pp. 296–299, and *The Application of Laser Light Scattering to the Study of Biological Motion*, ed. By J. C. Earnshaw and M. W. Steer, Plenum Press, New York, 1983, pp. 53–76.

A 3-L, round bottom flask was equipped with a condenser, addition funnel, mechanical stirrer, and temperature controller probe. Polymerizations were carried out under a nitrogen atmosphere in the flask.

Monomers and initiators were commercially available (Aldrich Chemical Co., Milwaukee, Wis.) and used as received. Ammonium lauryl sulfate was Polystep B-7, a 29% solution in deionized water, available from Stepan Co., Northfield, Ill.

TABLE 1

Polymer 1 (P1)
Ingredients for Synthesis of Polymer 1.

| Reagent | M Weight | Moles | Grams |
|---|---|---|---|
| Ammonium Lauryl Sulfate | 283.00 | 0.0068 | 6.90 |
| Ammonium Persulfate | 228.20 | 0.0009 | 0.2 |
| Methyl Methacrylate | 100.12 | 0.1998 | 20 |
| Glycidyl Methacrylate | 142.15 | 0.0563 | 8 |
| Butyl Acrylate | 128.17 | 0.0000 | 320 |
| Styrene | 104.15 | 0.3841 | 40 |
| Methacrylic Acid | 86.09 | 0.1394 | 12 |

The materials shown in Table 1 were employed in the quantities shown.

700 mL of water and the ammonium lauryl sulfate were charged to the flask, which was stirred and heated to 85° C. The ammonium persulfate was dissolved in 100 mL water, and 80 mL of this persulfate solution was added to the flask. Half of the monomers, except for the methacrylic acid, were mixed and charged to the addition funnel, and about 20 mL was added immediately to the flask. After a few minutes, the remainder in the funnel was added, dropwise, over a time period of about 1 hour, while the temperature in the flask was held between 85 and 90° C. The remaining monomers, including the methacrylic acid, were mixed, added to the addition funnel, and added to the reaction over an additional time period of 1 hour, still keeping the temperature in the flask between 85 and 90° C. After the addition was finished, the remaining persulfate solution was added, and the reaction was heated to 85° C. cooled to 60° C., and filtered through paint strainers into plastic bottles.

Solids content was measured by putting about 5 grams of latex in a tared, 5-cm aluminum pan, which was placed in a 75° C. vacuum oven at about 400 mm Hg vacuum for 1 to 2 days. Physical properties are shown in Table 3.

Polymers 2–7 (P2–P7)

Polymers 2–7 were prepared in a manner identical to that of Polymer 1 in both materials and conditions, but with different amounts of those materials. The various composition employed are shown in Table 3.

Polymer 8 (P8)

Polymer 8 was prepare in the same manner as Polymers 1–7, but with somewhat different ingredients, shown in Table 2. In contrast with Polymers 1–7, no butyl acrylate was employed, but a plasticizer was added. The plasticizer was a 3:1 Caprolactone/1,4-Cyclohexanedimethanol adduct prepared as described in U.S. Pat. No. 5,159,047.

TABLE 2

Ingredients for Synthesis of Polymer 8.

| Reagent | M Weight | Moles | Grams |
|---|---|---|---|
| Ammonium Lauryl Sulfate | 283.00 | 0.0068 | 6.90 |
| Ammonium Persulfate | 228.20 | 0.0009 | 0.2 |
| Methyl Methacrylate | 100.12 | 1.7979 | 180 |
| Glycidyl Methacrylate | 142.15 | 0.0563 | 8 |
| Styrene | 104.15 | 1.9203 | 200 |
| Methacrylic Acid | 86.09 | 0.1394 | 12 |
| Plasticizer | | | 100 |

700 mL of water and the ammonium lauryl sulfate were charged to the flask, which was stirred and heated to 85° C. The ammonium persulfate was dissolved in 100 mL water, and 80 mL of this persulfate solution was added to the flask. Half of the monomers, except for the methacrylic acid, and half of the plasticizer, were mixed and charged to the addition funnel, and about 20 mL was immediately added to the flask. After a few minutes, the remainder was added, dropwise, over a time period of about 1 hour while the temperature in the flask was held between 85 and 90° C. The remaining monomers and plasticizer were mixed, added to the addition funnel, and added to the reaction over 1 hour, keeping the temperature in flask between 85 and 90° C. After the addition was finished, the remaining persulfate solution was added, and the reaction was heated to 85° C., cooled to 60° C., and filtered through paint strainers into plastic bottles.

TABLE 3

Analytical Data and compositions for Polymer Latexes

| Polymer | % MMA | % BA | % MAA | % GMA | % STY | % Solids | Particle Size | Tg | Mn/1000 | Mw/1000 |
|---|---|---|---|---|---|---|---|---|---|---|
| P1 | 5 | 80 | 3 | 2 | 10 | 32.7 | 83.1 | −21 | 96 | 319 |
| P2 | 95 | 0 | 3 | 2 | 0 | 33.5 | 79.5 | 130 | | |
| P3 | 15 | 80 | 3 | 2 | 0 | 33.4 | 91.4 | −27 | | |
| P4 | 85 | 0 | 3 | 2 | 10 | 33.4 | 77.7 | 126 | | |
| P5 | 45 | 0 | 3 | 2 | 50 | 33.3 | 80.8 | 113 | | |
| P6 | 70 | 0 | 3 | 2 | 25 | 33.4 | 81.4 | 121 | | |
| P7 | 34 | 12 | 3 | 1 | 50 | 33 | 92 | 87 | 40 | 388 |
| P8 | 45 | 0 | 3 | 2 | 50 | 38.0 | 84.2 | 63 | 122 | 487 |

Formation of Laserable Assemblages

The following examples demonstrate the steps as shown in FIGS. 3A–G in forming a color filter array of the invention. The donors and receivers comprised polymers with crosslinkable functional groups. The receiver further comprised a crosslinkable organic layer coated on a substrate that upon lamination of the patterned color layer to glass acted effectively as a planarizing layer.

In FIG. 3A, the transfer layer (3) of the donor element was imaged by focusing an infrared beam onto the metal layer (2) positioned between the substrate (1) and the transfer layer (3). The heat from the metal layer (2) transferred the imaged portions of the transfer layer (3) onto the image receiving layer (4) of the receiver element. Imaging was performed using a Spectrum Trendsetter exposure unit (Creo Inc. Vancouver, Canada). The system consisted of an 81.2-cm long drum 91-cm in perimeter. The donor and receiver elements were independently loaded into the machine, the donor element being slightly larger in size than the receiver element. Their respective positions on the rotating drum and contact between the elements were maintained by the application of vacuum.

The donor element was exposed with an array of 240 overlapping 5×2 micron spots that result from the splitting through a light valve of the laser beam from a 20 watt infrared diode laser emitting at 830 nm in 1 microsecond pulses. The drum speed was varied from 60 to 170 RPM that provided incident energy densities ranging from 125 to 550 mJ/cm2. The donor and receiver elements were then separated wherein an image (6) was formed on the image receiving layer of the receiver element. Alternately, the imaging steps were repeated at least once with donor elements having a transfer layer comprising a different pigment dispersion.

The receiver element comprising a single or multicolor image on the image receiving layer (4) was laminated to glass treated with an adhesion promotor, and the receiver support (Melinex® 574 PET) was peeled off. This resulted in a color filter comprised of glass treated with an adhesion promoter, a color filter pattern and the image receiving layer (4) on top that may function as a planarizing layer. Both the transferred color image and the image receiving layer were thermally crosslinkable.

The color filter donor films comprised a three layer structure: 1) a donor support (for example Melinex® 574 backing), 2) a thin sputtered metal layer (2), and 3) a 1 micron thick pigmented layer of the formulation in each specific example which had been rod coated onto the sputtered metal layer. The image receiving layer of the formulations listed below was coated to 1 micron in thickness onto a 4-mil Melinex® 574 (available from DuPont) receiver support.

In each specimen, the pigmented transfer layer on the donor element comprised at least two of the polymeric binders P1–P8, the low $T_g$ component selected from P1 or P3, and the high $T_g$ component selected from P2, P4, P5, P6, P7 or P8. In addition binders usable in color filter compositions are preferably crosslinkable since they are exposed to a variety of solvents in the building of the face plate for an LCD display.

All temperatures throughout the specification are in ° C. (degrees Centigrade) and all percentages are weight percentages unless indicated otherwise.

Examples 1–4

The formulations in the following examples illustrate the ability to control quality of the transferred image as a function of the styrene content in the high $T_g$ binder. The samples comprise two binders; with high and low $T_g$ at a concentration ratio of 85 to 15% respectively. Images that transferred without heat induced decomposition show a high degree of gloss and thus high optical density. In contrast, when the heat generated during transfer leads to the decomposition of the binder the transfer material exhibits reduced gloss and optical density. In order to effect cross-linking after transfer, it is particularly important that the binders be transferred with minimal degradation. Black films, are particularly susceptible to degradation. Degradation was reduced by incorporation of styrene comonomers in the polymeric binders.

The donor element was fabricated by sputter coating an 8 nm thickness of metallic chromium, having 40% optical transmission onto a 102 μm thick Melinex® 574 base. Metal thickness was monitored in situ using a quartz crystal and after deposition by measuring optical frequency reflection and transmission of the deposited films. The black-pigmented transfer layer comprised a black pigment dispersion having a pigment to dispersant (p/d) ratio of 2 incorporated into the compositions specified in Table 4. The pigmented layer was deposited upon the metallic layer by coating using a Waterproof®CV coater available from the DuPont Company, Wilmington, Del., equipped with a #6 Meyer rod. The film was dried at 45° C. for 5 minutes. The thickness of the pigmented layer was 1.0 μm. PEG300 and PEG6800 were oligomeric polyethylene glycol plasticizers. Zonyl® FSA was a fluorinated surfactant available from the DuPont Company. The percentage of low $T_g$ binder in the composition is expressed as a percentage of the total weight of binder in the transfer layer.

The optical densities listed in Table 5 below represent the density of the pigment transfered onto a receiver at the specified drum speed (and therefore, sensitivity). Densities were measured in transmission using a MacBeth reflection densitometer (Newburgh, N.Y.).

TABLE 5

| Drum Speed (rpm) | Optical Density | | | |
|---|---|---|---|---|
| | Ex. 1 | Ex. 2 | Ex. 3 | Ex. 4 |
| 100 | 2.14 | 2.2 | 2.19 | 3.23 |
| 110 | 2.1 | 2.03 | 2.03 | 3.21 |
| 120 | 2.13 | 2.06 | 3.34 | 3.67 |
| 130 | 2.28 | 2.03 | 3.59 | 3.68 |
| 140 | 2.81 | 3.01 | 3.67 | 3.68 |
| 150 | 3.2 | 3.45 | 3.69 | 3.69 |
| 160 | 3.3 | 3.41 | 3.66 | 3.67 |
| 170 | 3.32 | 3.45 | 3.65 | 3.61 |
| 180 | 3.37 | 3.52 | 3.63 | 3.49 |
| 190 | 3.46 | 3.43 | 3.63 | 3.61 |
| 100 | 3.42 | 3.48 | 3.48 | 3.58 |

Examples 5–8

In Examples 5–8, the optical density of the transferred film at different transfer speeds was used as an indication of the thermal stability of the transferred layer. Higher gloss and optical density were indicators of higher thermal stability during transfer.

The specimens were prepared using the methods and materials described in Examples 1–4. The thickness of the pigmented layer was 10 μm. Compositions are shown in Table 6.

TABLE 4

| Ingredient | % styrene | Ex. 1 | | Ex. 2 | | Ex. 3 | | Ex. 4 | |
|---|---|---|---|---|---|---|---|---|---|
| | | % | (g) | % | (g) | % | (g) | % | (g) |
| Black Pigment Dispersion p/d 2 | | 60.000 | 12.000 | 60.000 | 12.000 | 60.000 | 12.000 | 60.000 | 12.000 |
| P2 | 0 | 32.300 | 2.9400 | | | | | | |
| P4 | 10 | | | 32.300 | 2.9400 | | | | |
| P6 | 25 | | | | | 32.300 | 2.9400 | | |
| P5 | 50 | | | | | | | 32.300 | 2.9400 |
| P3 | | 5.7000 | 0.5200 | 5.7000 | 0.5200 | 5.7000 | 0.5200 | 5.7000 | 0.5200 |
| PEG 300 | | 2.0000 | 0.0600 | 2.0000 | 0.0600 | 2.0000 | 0.0600 | 2.0000 | 0.0600 |
| Zonyl ® FSA | | | 0.0400 | | 0.0400 | | 0.0400 | | 0.0400 |
| H$_2$O | | | 4.4400 | | 4.4400 | | 4.4400 | | 4.4400 |
| % Low T$_g$ | | 15% | | 15% | | 15% | | 15% | |
| solids | | 15% | 3 | 15% | 3 | 15% | 3 | 15% | 3 |

TABLE 6

|  | % styrene | Ex. 5 % | Ex. 5 (g) | Ex. 6 % | Ex. 6 (g) | Ex. 7 % | Ex. 7 (g) | Ex. 8 % | Ex. 8 (g) |
|---|---|---|---|---|---|---|---|---|---|
| Black Pigment p/d 2 |  | 60.000 | 12.000 | 60.000 | 12.000 | 60.000 | 12.000 | 60.000 | 12.000 |
| P2 | 0 | 32.3000 | 2.9400 |  |  |  |  |  |  |
| P4 | 10 |  |  | 32.300 | 2.9400 |  |  |  |  |
| P6 | 25 |  |  |  |  | 32.300 | 2.9400 |  |  |
| P5 | 50 |  |  |  |  |  |  | 32.300 | 2.9400 |
| PEG 6800 |  | 5.7000 | 0.5200 | 5.7000 | 0.5200 | 5.7000 | 0.5200 | 5.7000 | 0.5200 |
| PEG 300 |  | 2.0000 | 0.0600 | 2.0000 | 0.0600 | 2.0000 | 0.0600 | 2.0000 | 0.0600 |
| Zonyl ® FSA |  |  | 0.0400 |  | 0.0400 |  | 0.0400 |  | 0.0400 |
| H2O |  |  | 4.3900 |  | 4.3900 |  | 4.3900 |  | 4.3900 |
| % Low Tg |  | 15% |  | 15% |  | 15% |  | 15% |  |
| Solids |  | 15% | 3 | 15% | 3 | 15% | 3 | 15% | 3 |
| TOTAL |  | 100% | 20.000 | 100% | 20.000 | 100% | 20.000 | 100% | 20.000 |

The optical densities in Table 7 below represent the optical density of the black pigment layer transferred onto a receiver sheet at the specified drum speed (and therefore, sensitivity). Densities were measured using a McBeth reflection densitometer (Newburgh, N.Y.).

TABLE 7

| DS | Ex. 5 | Ex. 6 | Ex. 7 | Ex. 8 |
|---|---|---|---|---|
| 100 | 1.09 | 1.96 | 2.2 | 1.08 |
| 110 | 1.95 | 2.24 | 2.13 | 2.06 |
| 120 | 2.08 | 2.31 | 2.19 | 2.2 |
| 130 | 2.13 | 2.28 | 2.49 | 3.23 |
| 140 | 2.2 | 2.42 | 2.61 | 3.45 |
| 150 | 2.3 | 2.3 | 3.38 | 3.42 |
| 160 | 2.24 | 2.23 | 3.35 | 3.43 |
| 170 | 2.32 | 2.46 | 3.52 | 3.3 |
| 180 | 2.55 | 2.51 | 3.45 | 3.48 |
| 190 | 2.77 | 2.91 | 3.43 | 3.52 |
| 100 | 3.43 | 3.61 | 3.43 | 3.32 |

Examples 9–11

In Examples 9–11, the binder polymers were crosslinkable, and upon lamination on to glass, the receiver layer became the planarizing layer for a color filter. The heating layer and substrate were the same as in Examples 5–8. The pigmented transfer layers were coated using commercial coating equipment to 63 cm width and 1 µm in thickness. Compositions are shown in Table 8.

As shown in FIG. 3, the laserable assemblage comprising the donor element and the receiver element is exposed through the donor element in selected areas by radiation in the form of heat or light, e.g. a laser. If the transfer layer (3) of the donor element is red, then a red image (6) is transferred to the image receiving layer (4) of the receiver element. After exposure, the donor element is separated from the receiver element.

The transfer step can be repeated with the same receiver element bearing the first image (6) and one or more different donor elements having a colorant of a different color, e.g. blue or green, to prepare a multicolor color filter pattern comprising for example a red image (6), a blue image (7) and a green image (8). If the receiver support is the permanent substrate, e.g. glass, this forms a color filter. Alternately, as shown in FIG. 3, the multicolor image, comprising for example green, blue and red, may be laminated to the permanent substrate, e.g. glass, and the receiver support layer (5) is peeled off to form a color filter.

The receiver backing (5) consists of a Melinex® 574 polyester base, coated with the crosslinkable composition specified in Table 8b to a thickness of 1 micron (4). In FIG. 3, (2) designates a thin layer of metal. (3) is a donor coating.

The images were produced as previously described using the spectrum Trendsetter. After the patterning of the first color was completed on the receiver (6), the first donor was unloaded and the second donor was automatically loaded onto the receiver. After the patterning of the second color was completed (7) the procedure was repeated with sequential colors (8). After all colors were completed the receiver was unloaded and laminated onto glass (10) onto which an adhesive was spin coated (9) and the backing of the receiver (5) was removed.

Figure 4:
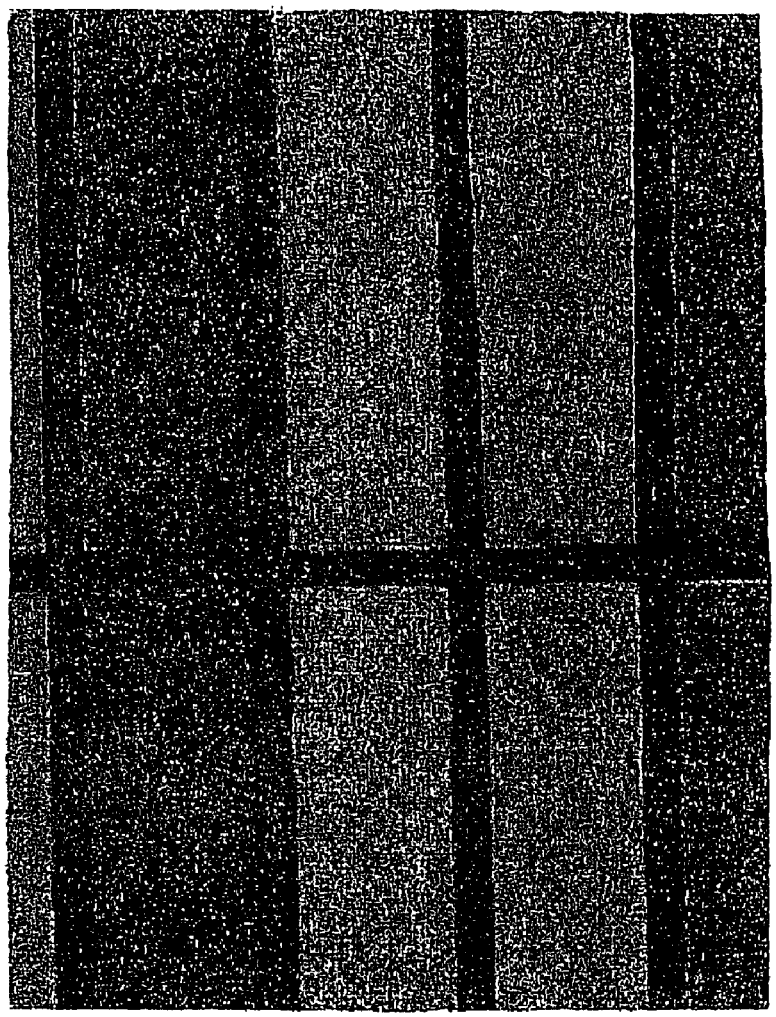
FIG. 4 is a photomicrograph for the image transferred according to Example 9.

The color filter on glass shown in FIG. 4 below was produced following the procedure previously described. The specific red, blue, green (Table 8a) and crosslinkable receiver formulations (Table 8b) are included. The lamination was performed at 120° C. on a flat press.

TABLE 8a

| | Donor Compostions | | | | | |
|---|---|---|---|---|---|---|
| | Red | | Green | | Blue | |
| Material | % Solids | Weight (g) | % Solids | Weight (g) | % Solids | Weight (g) |
| PEG-300 | — | — | 1.98% | 0.148 | — | — |
| SDA-4927 | 2.00% | 0.150 | 1.48% | 0.111 | 2.00% | 0.150 |
| Zonyl ® FSA | 0.50% | 0.038 | 1.25% | 0.094 | 0.50% | 0.038 |
| Red Pigment dispersion | 60.06% | 30.030 | — | — | — | — |
| Green Pigment Dispersion | — | — | 59.25% | 29.626 | — | — |
| Blue Pigment Dispersion p/d = 4 | — | — | — | — | 60.00% | 30.000 |

TABLE 8a-continued

| | Donor Compostions | | | | | |
|---|---|---|---|---|---|---|
| | Red | | Green | | Blue | |
| Material | % Solids | Weight (g) | % Solids | Weight (g) | % Solids | Weight (g) |
| P1 | 3.70% | 0.841 | 5.41% | 1.230 | 7.50% | 1.705 |
| P5 | 33.74% | 7.668 | 30.63% | 6.962 | 30.00% | 6.818 |
| | — | 11.274 | — | 11.830 | — | 11.290 |
| | 15.00% | | 15.00% | | 15.00% | |
| | 100% | 50.00 | 100% | 50.00 | 100% | 50.00 |

TABLE 8b

| | Receiver Composition | |
|---|---|---|
| Receiver | 10.5% solids Sol'n % | Ctg % |
| Water (distilled) | 62.0 | |
| Zonyl FSA (25% in IPA/Water) | 0.4 | 1.0 |
| Butyl Cellosolve | 6.0 | |
| Acrylic Latex RCP24692 High Tg (33%, in water) | 22.1 | 69.3 |
| Acrylic Latex RCP26061 Low Tg (33%, in water) | 9.5 | 29.7 |

Examples 12–16

The formulations in the following examples illustrate the ability to control line edge resolution of the transferred material as a function of the low $T_g$ to high $T_g$ binder ratio. That is, in Table 10 below each blue formulation comprises two binders; with high and low glass transition temperatures and the ratio of the low ratio was varied from 10 to 20% of the total binder content. The donor film was fabricated as in Examples 5–8. The blue pigmented layers of the formulation specified in Table 9 were coated using a Waterproof®CV coater (DuPont) with a #6 Meyer rod. The film was dried at 45° C. for 5 minutes. The thickness of the pigmented layer was 1.0 μm.

Examples 17–19

In the formulations in the following examples the presence of the caprolactone plasticizer in the latex allowed for high resolution with improved adhesion upon transfer even after raising the glass transition of the high $T_g$ latex from 80° C. (ex 12–16) to 118° C. for these examples. In these examples the ratio of low $T_g$ binder was varied from 8 to 10%. Table 10 below shows blue formulations comprising two binders; with high (118° C.) and low glass transition temperatures (−22° C.). The donor element was fabricated according to the method employed in Examples 12–16.

TABLE 10

| | ex. 17 | | Ex. 18 | | Ex. 19 | |
|---|---|---|---|---|---|---|
| | % | (g) | % | (g) | % | (g) |
| Blue Pigment Dispersion | 60.0000 | 30.0000 | 60.0000 | 30.0000 | 60.0000 | 40.0000 |
| P5 | 29.1200 | 6.6200 | 30.5250 | 6.9400 | 31.4500 | 7.1500 |
| P1 | 2.8800 | 0.6500 | 6.4750 | 1.4700 | 5.5500 | 1.2600 |
| P8 | 5 | 0.97 | | | | |
| SDA | 2.5000 | 0.1875 | 2.5000 | 0.1875 | 2.5000 | 0.1875 |
| Zonyl ® FSA | 0.5000 | 0.0375 | 0.5000 | 0.0375 | 0.5000 | 0.0375 |
| H2O | | 11.5350 | | 11.3650 | | 11.3650 |
| Plasticizer | 1.00% | | 1.00% | | 1.00% | |
| % Low Tg | 8.00% | | 9.00% | | 10.00% | |
| Solids | 15% | 7.5 | 15% | 7.5 | 15% | 7.5 |
| TOTAL | | 50.0000 | | 50.0000 | | 50.0000 |

Examples 20–23

In the formulations of these different levels of plasticizer in the latex allowed for adjusting the adhesion of the transfer layer to the receiver.

The donor film comprisd a Cr heating layer 8 nm in thickness and characterized by 40% transmission sputter coated onto a 4 mil Melinex® 574 base. The metal thickness, sputtered at Vacuum Deposit Inc. (Louisville, K.Y.), was monitored in situ using a quartz crystal and after deposition by measuring reflection and transmission of the films. The red pigmented layers of the formulations specified in the table below were coated using a Waterproof® CV

TABLE 9

| | ex. 12 | | Ex. 13 | | Ex. 14 | | Ex. 15 | | Ex. 16 | |
|---|---|---|---|---|---|---|---|---|---|---|
| | % | (g) | % | (g) | % | (g) | % | (g) | % | g |
| Blue Pigment Dispersion | 60.0000 | 30.000 | 60.000 | 30.000 | 60.000 | 40.000 | 60.000 | 12.000 | 60.000 | 30.000 |
| P7 | 29.600 | 6.7300 | 30.525 | 6.9400 | 31.450 | 7.1500 | 32.275 | 7.3600 | 33.300 | 7.5700 |
| P1 | 7.4000 | 1.6800 | 6.4750 | 1.4700 | 5.5500 | 1.2600 | 4.6250 | 1.0500 | 3.7000 | 0.8400 |
| SDA | 2.5000 | 0.1875 | 2.5000 | 0.1875 | 2.5000 | 0.1875 | 2.5000 | 0.1875 | 2.5000 | 0.1875 |
| Zonyl ® FSA | 0.5000 | 0.0375 | 0.5000 | 0.0375 | 0.5000 | 0.0375 | 0.5000 | 0.0375 | 0.5000 | 0.0375 |
| H2O | | 11.365 | | 11.365 | | 11.365 | | 11.365 | | 11.365 |
| % Low Tg | 20.00% | | 17.50 | | 15.0% | | 12.5% | | 10.0% | |
| Solids | 15% | 7.5 | 15% | 7.5 | 15% | 7.5 | 15% | 7.5 | 0.1000 | 7.5000 |
| TOTAL | | 50.000 | | 50.000 | | 50.000 | | 50.000 | | 50.000 |

Figure 5:
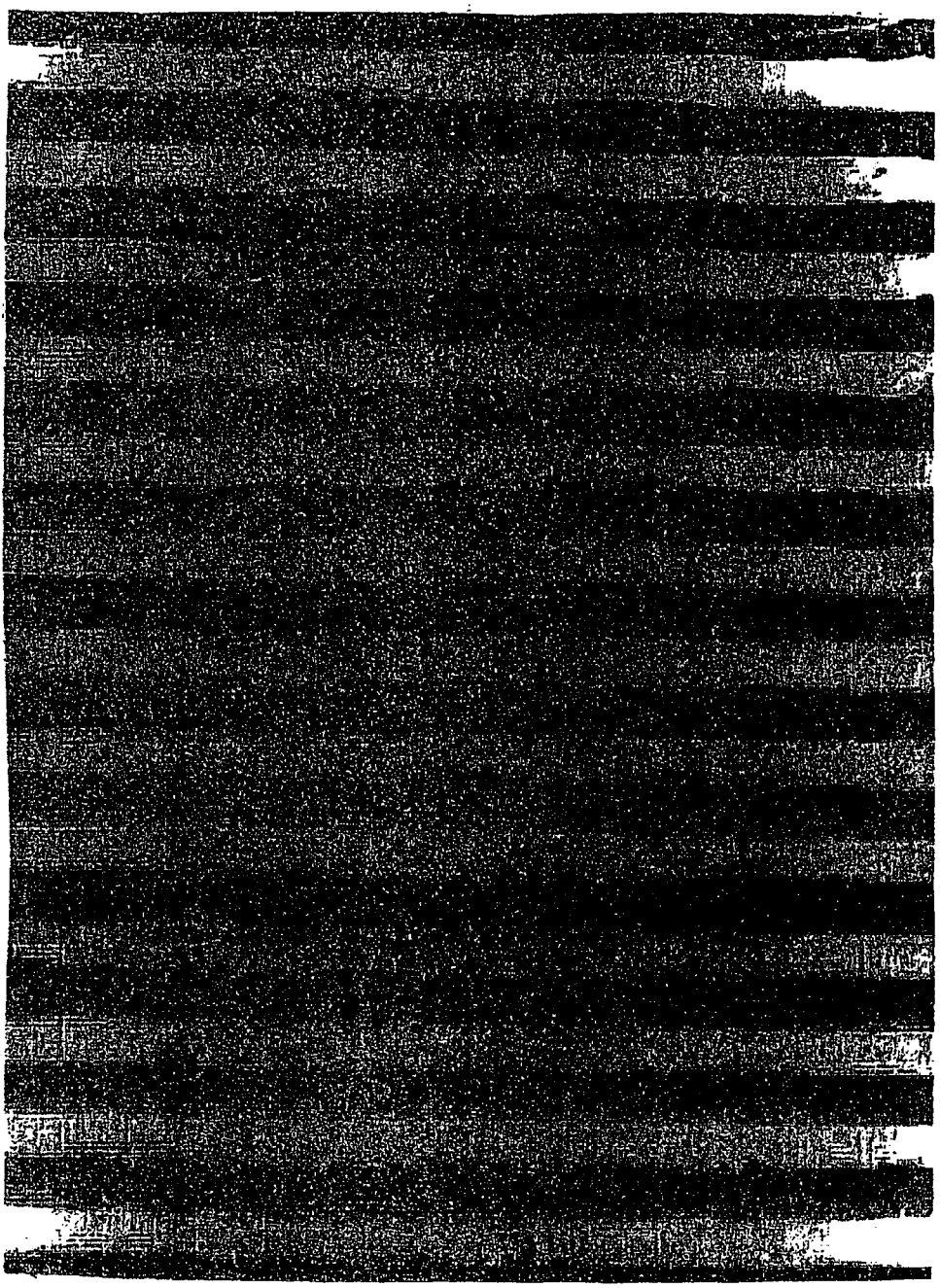
FIG. 5 is a photomicrograph for the image transferred according to Example 12.
Figure 6:
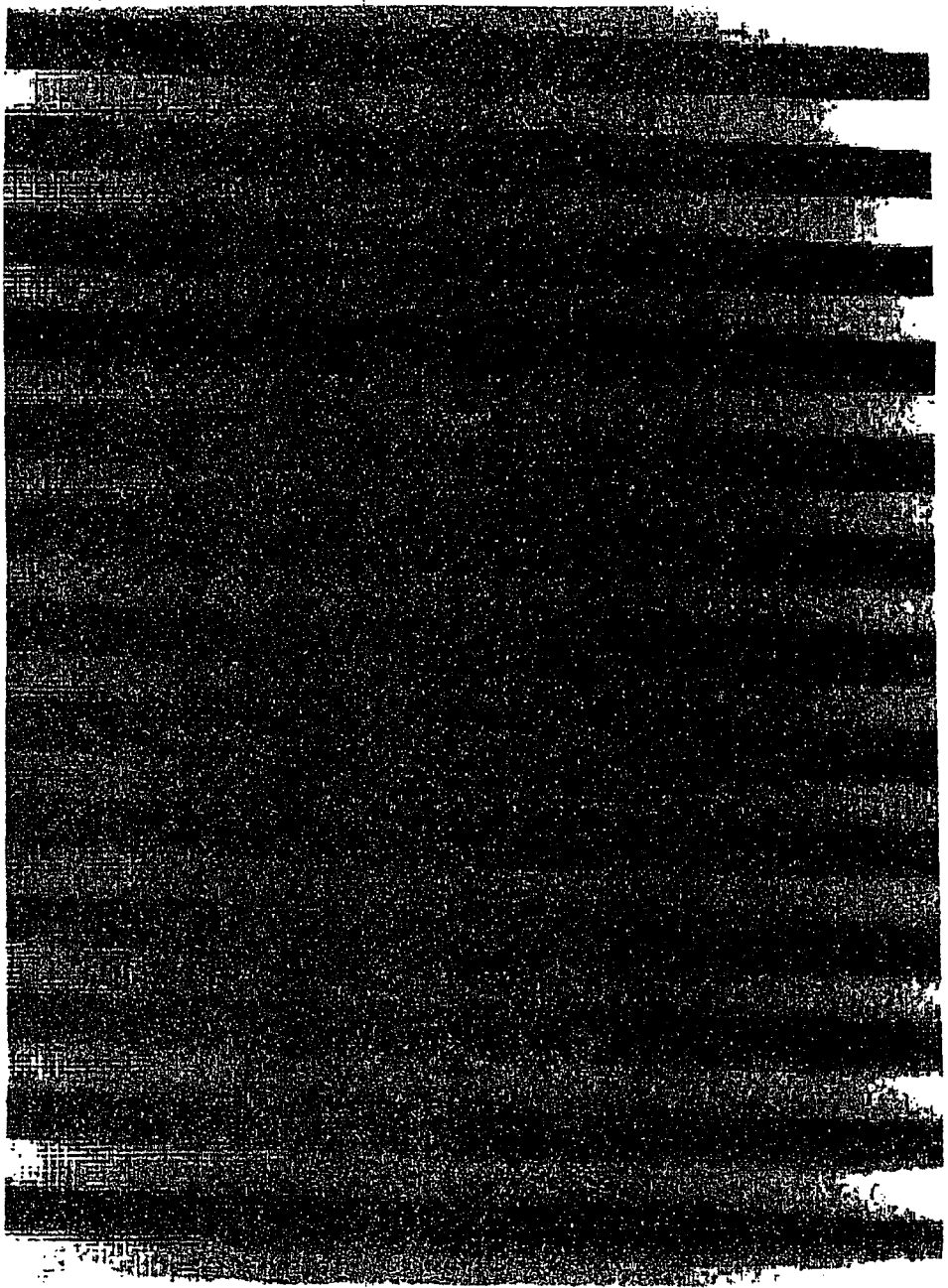
FIG. 6 is a photomicrograph for the image transferred according to Example 16

FIGS. 5 and 6 illustrate the effect of binder ratio on line edge resolution as obtained in Examples 12 and 16 respectively.

coater (DuPont) with a #6 Meyer rod. The film was dried at 45° C. for 5 minutes. The thickness of the pigmented layer was 1.0 μm. Compositions are shown in Table 11.

TABLE 11

|  | Ex. 20 | | Ex. 21 | | Ex. 22 | | Ex. 23 | |
| --- | --- | --- | --- | --- | --- | --- | --- | --- |
|  | % | (g) | % | (g) | % | (g) | % | (g) |
| Blue Pigment Dispersion | 70.000 | 35.000 | 70.0000 | 35.0000 | 70.0000 | 35.0000 | 70.0000 | 35.0000 |
| P5 | 20.115 | 4.5700 | 15.2050 | 3.4600 | 10.4750 | 2.3800 | 5.3800 | 1.2200 |
| P1 | 2.3850 | 0.5400 | 2.2950 | 0.5200 | 2.0250 | 0.5000 | 2.1150 | 0.4800 |
| P8 | 5 | 0.97 | 10 | 1.95 | 15 | 2.92 | 20 | 3.9 |
| SDA | 2.0000 | 0.1500 | 2.0000 | 0.1500 | 2.0000 | 0.1500 | 2.0000 | 0.1500 |
| Zonyl ® FSA | 0.5000 | 0.0375 | 0.5000 | 0.0375 | 0.5000 | 0.0375 | 0.5000 | 0.0375 |
| H2O | | 8.7300 | | 8.8900 | | 9.0100 | | 9.2100 |
| Plasticizer | 1.00% | | 2.00% | | 3.00% | | 4.00% | |
| % Low Tg | 9.00% | | 9.00% | | 9.00% | | 9.00% | |
| Solids | 15% | 7.5 | 15% | 7.5 | 15% | 7.5 | 15% | 7.5 |
| TOTAL | | 50.000 | | 50.0000 | | 50.0000 | | 50.0000 |

Figure 7:
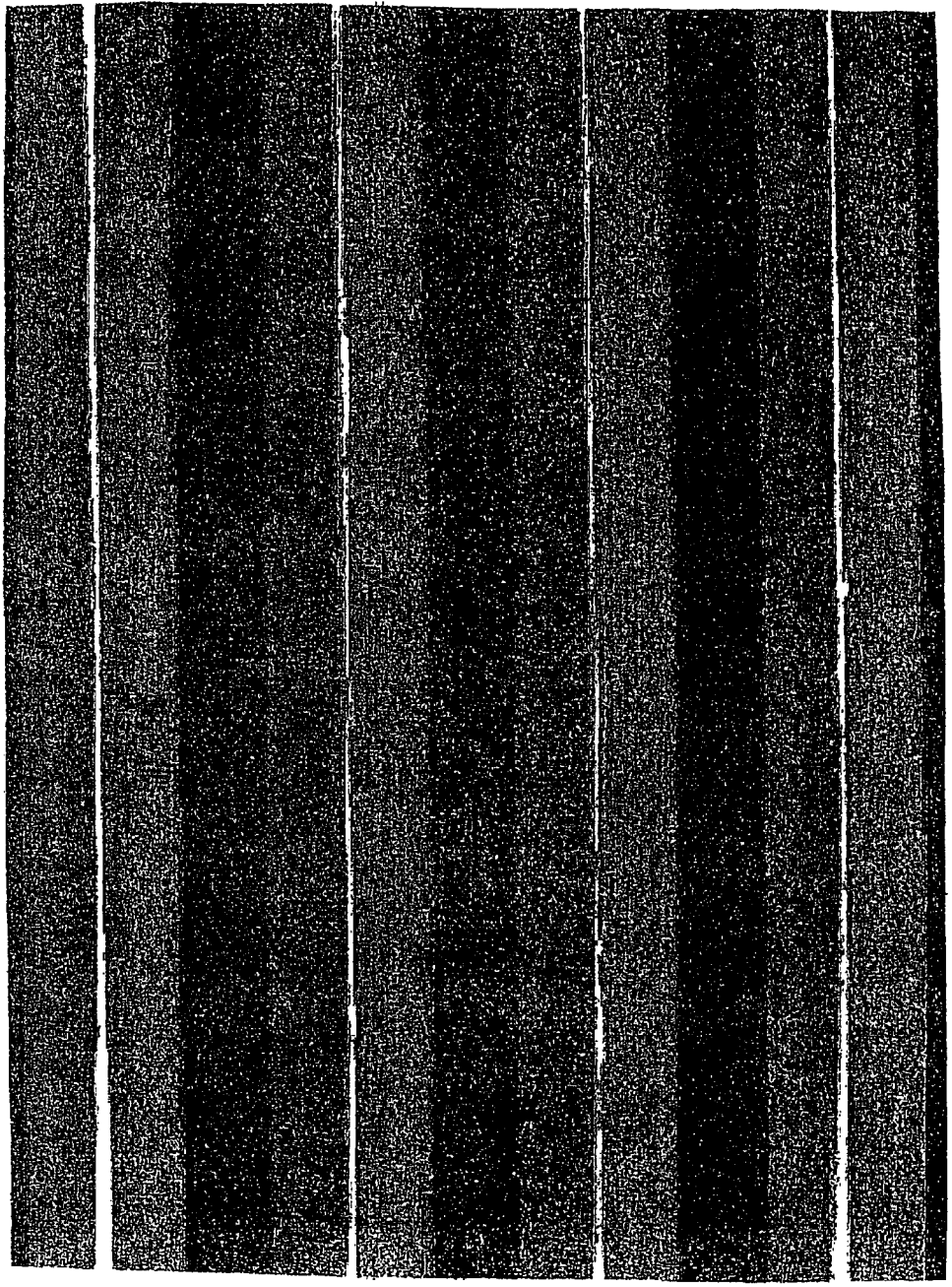
FIG. 7 is a photomicrograph for the image transferred according to Example 21.

A three color filter on which red (Ex. 21) was transferred third and green and blue were transferred 1$^{st}$ and 2$^{nd}$, respectively is shown in FIG. 7.

What is claimed is:

1. In a donor element suitable for incorporation into a laserable assemblage, wherein the donor element comprises a substrate, a metallic or carbon heating layer, one or more transfer layers and an optional ejection layer, the improvement comprising a transfer layer deposited on said heating layer, said transfer layer comprising an imageable component and a binder composition comprising a first polymeric binder and a second polymeric binder, said first polymeric binder being characterized by a glass transition temperature at least 20 centigrade degrees higher than the glass transition temperature characteristic of said second polymeric binder;

wherein said first polymeric binder is selected from the group consisting of polystyrene and copolymers thereof, acrylites, methacrylates and co-polymers thereof, and wherein further said second polymeric binder is selected from the group consisting of butyl methacrylates and co-polymers thereof.

2. A laserable assemblage comprising:

a donor element, wherein the donor element comprises a substrate, a metallic or carbon heating layer, one or more transfer layers and an optional ejection layer the donor element further comprising a transfer layer deposited on said heating layer, said transfer layer comprising an imageable component a binder composition comprising a first polymeric binder and a second polymeric binder, said first polymeric binder being characterized by a glass transition temperature at least 20 centigrade degrees higher than the glass transition temperature characteristic of said second polymeric binder; and a receiver element in effective contact with the transfer layer of the donor element;

wherein said first polymeric binder is selected from the group consisting of polystyrene and copolymers thereof, acrylates, methacrylates and co-polymers thereof, and wherein further said second polymeric binder is selected from the group consisting of butyl methacrylates and co-polymers thereof.

3. An imaged laserable assemblage comprising an imageable component and a binder composition comprising a first polymeric binder and a second polymeric binder, said first polymeric binder being characterized by a glass transition temperature at least 20 centigrade degrees higher than the glass transition temperature characteristic of said second polymeric binder; wherein said first polymeric binder is selected from the group consisting of polystyrene and copolymers thereof, acrylates, methacrylates and co-polymers thereof, and wherein further said second polymeric binder is selected from the group consisting of butyl methacrylates and co-polymers thereof.

4. An image disposed upon a substrate, the image comprising an imageable component and a binder composition comprising a first polymeric binder and a second polymeric binder, said first polymeric binder being characterized by a glass transition temperature at least 20 centigrade degree higher than the glass transition temperature characteristic of said second polymeric binder, wherein said first polymeric binder is selected from the group consisting of polystyrene and copolymers thereof, acrylate, methacrylates and co-polymers thereof, and wherein further said second polymeric binder is selected from the group consisting of butyl methacrylates and co-polymers thereof.

5. A color filter array comprising an image disposed upon a substrate, the image comprising an imageable component and a binder composition comprising a first polymeric binder and a second polymeric binder, said first polymeric binder being characterized by a glass transition temperature at least 20 centigrade degrees higher than the glass transition temperature characteristic of said second polymeric binder; wherein said first polymeric binder in selected from the group consisting of polystyrene and copolymers thereof, acrylates, methacrylates and co-polymers thereof and wherein further said second polymeric binder is selected from the group consisting of butyl methacrylates and co-polymers thereof.

6. The donor element of claim 1 or the laserable assemblage of claim 2 or the imaged laserable assemblage of claim 3 or the image disposed upon a substrate of claim 4 or the color filter array of claim 5 wherein said first polymeric binder is characterized by a glass transition temperature at least 80 centigrade degrees higher than the glass transition temperature characteristic of said second polymer.

7. The donor element of claim 1 or the laserable assemblage of claim 2 or the imaged laserable assemblage of claim 3 or the image disposed upon a substrate of claim 4 or the color filter array of claim 5 wherein said first polymeric binder is characterized by a glass transition temperature in the range of 70° C.–140° C. and said second polymeric binder is characterized by a glass transition temperature in the range of −40° C.–60° C.

8. The donor element of claim 7 wherein said first polymeric binder is characterized by a glass transition temperature in the range of 100° C.–140° C. and said second polymeric binder is characterized by a glass transition temperature in the range of –40° C.–0° C.

9. The donor element of claim 1 or the laserable assemblage of claim 2 or the imaged laserable assemblage of claim 3 or the image disposed upon a substrate of claim 4 or the color filter array of claim 5 wherein said binder composition comprises at least one crosslinkablefunctional group.

10. The donor element of claim 1 or the laserable assemblage of claim 2 or the imaged laserable assemblage of claim 3 or the image disposed upon a substrate of claim 4 or the color filter way of claim 5 wherein said first polymeric binder and said second polymeric binder comprise one or more crosslinkablefunctional groups.

11. The donor element of claim 1 or the laserable assemblage of claim 2 or the imaged laserable assemblage of claim 3 or the image disposed upon a substrate of claim 4 or the color filter array of claim 5 wherein the weight ratio of said first polymeric binder to said second polymeric binder is in the range of 60:40 to 95:5.

12. The donor element of claim 1 wherein the weight ratio of said first polymeric binder to said second polymeric binder is in the range of 75:25 to 92:8.

13. The laserable assemblage of claim 2 or claim 3 wherein the receiver element comprises a crosslinkablebinder.

14. The donor element of claim 1 or the laserable assemblage of claim 2 or further comprising a polymeric substrate and the heating layer deposited on said substrate.

15. The donor element of claim 1 or the laserable assemblage of claim 2 wherein a donor support is present.

* * * * *